(12) United States Patent
Yasuda et al.

(10) Patent No.: US 11,956,539 B2
(45) Date of Patent: Apr. 9, 2024

(54) CORRECTION CONTROL APPARATUS, IMAGE CAPTURING APPARATUS, CONTROL METHOD, AND RECORDING MEDIUM

(71) Applicant: CANON KABUSHIKI KAISHA, Tokyo (JP)

(72) Inventors: Ryuichiro Yasuda, Tokyo (JP); Yu Narita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 17/846,239

(22) Filed: Jun. 22, 2022

(65) Prior Publication Data

US 2022/0417434 A1 Dec. 29, 2022

(30) Foreign Application Priority Data

Jun. 29, 2021 (JP) .................................. 2021-107824
May 10, 2022 (JP) .................................. 2022-077696

(51) Int. Cl.
*H04N 23/68* (2023.01)

(52) U.S. Cl.
CPC ....... *H04N 23/683* (2023.01); *H04N 23/6812* (2023.01)

(58) Field of Classification Search
CPC ............. H04N 23/683; H04N 23/6812; H04N 23/6811; H04N 23/687; H04N 23/60
USPC ........................................................ 348/55
See application file for complete search history.

(56) References Cited

U.S. PATENT DOCUMENTS

| 5,712,474 | A | * | 1/1998 | Naneda | .................. | H04N 23/68 |
| | | | | | | 348/240.1 |
| 7,606,476 | B2 | | 10/2009 | Toji | | |
| 8,488,901 | B2 | * | 7/2013 | Berestov | .................. | H04N 5/57 |
| | | | | | | 345/20 |
| 8,508,599 | B2 | * | 8/2013 | Miyasako | ............... | G06T 7/215 |
| | | | | | | 348/208.4 |
| 9,270,897 | B2 | * | 2/2016 | Ito | .......................... | G06T 5/002 |
| 10,516,875 | B2 | * | 12/2019 | Zhao | ....................... | G06T 7/521 |
| 11,308,658 | B2 | * | 4/2022 | Yang | ....................... | G06T 13/20 |
| 11,706,529 | B2 | * | 7/2023 | Masuda | ............... | H04N 23/689 |
| | | | | | | 348/55 |
| 2007/0172217 | A1 | | 7/2007 | Toji | | |

(Continued)

FOREIGN PATENT DOCUMENTS

JP   2007-201534 A   8/2007

*Primary Examiner* — Helen Shibru
(74) *Attorney, Agent, or Firm* — Venable LLP

(57) ABSTRACT

A correction control apparatus outputs a blur correction amount associated with an image blur with respect to a group of captured images. The apparatus obtains status information indicating an image capture status of the group of images, obtains a result of detection of a motion blur with respect to the group of images, derives the blur correction amount based on the obtained result, outputs the blur correction amount and controls a method of derivation of the blur correction amount. The apparatus includes a filter that extracts components of a first frequency band from the result, and derives the blur correction amount based on the components of the first frequency band associated with the motion blur extracted by the filter, and causes the first frequency band extracted by the filter to vary in accordance with the obtained status information.

21 Claims, 8 Drawing Sheets

(56) References Cited

U.S. PATENT DOCUMENTS

2019/0158780 A1* 5/2019 Mizuno .................. H04N 5/205
2023/0136616 A1* 5/2023 Narita .................... G06V 10/25
                                                      348/207.99

* cited by examiner

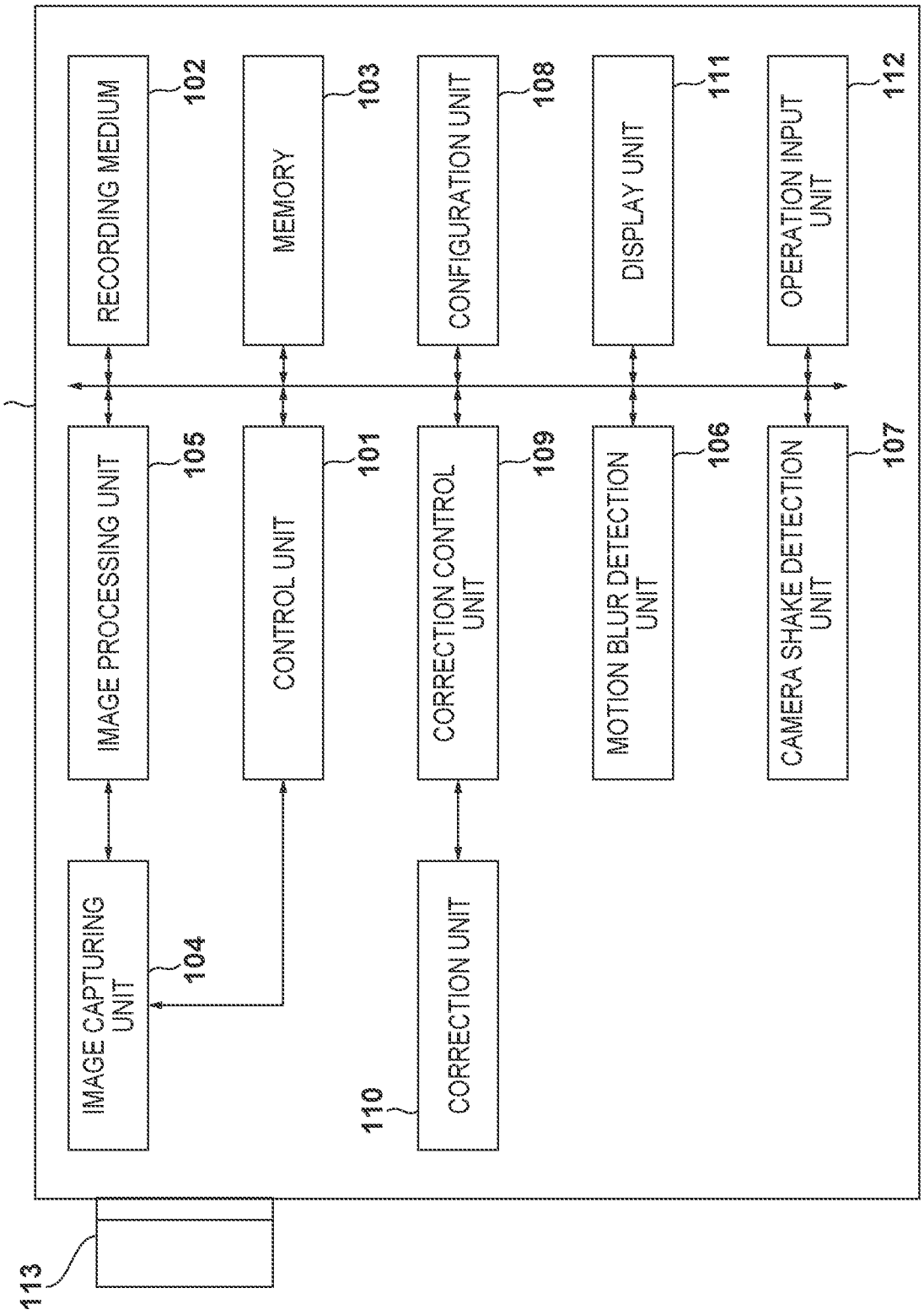

FIG. 2

|  | | DEGREE OF IMPORTANCE OF BACKGROUND REGION | CUTOFF FREQUENCY |
|---|---|---|---|
| CONTRAST VALUES OF BACKGROUND REGION | LOW | LOW | SET HIGH |
|  | HIGH | HIGH | SET LOW |
| DEPTH OF FIELD AT TIME OF IMAGE CAPTURE | SMALL | LOW | SET HIGH |
|  | LARGE | HIGH | SET LOW |
| FOCAL LENGTH AT TIME OF IMAGE CAPTURE | LONG | LOW | SET HIGH |
|  | SHORT | HIGH | SET LOW |
| RATE OF OCCUPANCY OF MAIN SUBJECT REGION | HIGH | LOW | SET HIGH |
|  | LOW | HIGH | SET LOW |
| DEGREE OF TRACKING OF MAIN SUBJECT AT TIME OF IMAGE CAPTURE | HIGH | LOW | SET HIGH |
|  | LOW | HIGH | SET LOW |
| DEGREE OF RELIABILITY OF MAIN SUBJECT DETECTION | HIGH | LOW | SET HIGH |
|  | LOW | HIGH | SET LOW |

FIG. 5

|  |  | DEGREE OF IMPORTANCE OF BACKGROUND REGION | GAIN FOR CAMERA SHAKE |
|---|---|---|---|
| CONTRAST VALUES OF BACKGROUND REGION | LOW | LOW | SET TO SMALL VALUE |
|  | HIGH | HIGH | SET TO LARGE VALUE |
| DEPTH OF FIELD AT TIME OF IMAGE CAPTURE | SMALL | LOW | SET TO SMALL VALUE |
|  | LARGE | HIGH | SET TO LARGE VALUE |
| FOCAL LENGTH AT TIME OF IMAGE CAPTURE | LONG | LOW | SET TO SMALL VALUE |
|  | SHORT | HIGH | SET TO LARGE VALUE |
| RATE OF OCCUPANCY OF MAIN SUBJECT REGION | HIGH | LOW | SET TO SMALL VALUE |
|  | LOW | HIGH | SET TO LARGE VALUE |
| DEGREE OF TRACKING OF MAIN SUBJECT AT TIME OF IMAGE CAPTURE | HIGH | LOW | SET TO SMALL VALUE |
|  | LOW | HIGH | SET TO LARGE VALUE |
| DEGREE OF RELIABILITY OF MAIN SUBJECT DETECTION | HIGH | LOW | SET TO SMALL VALUE |
|  | LOW | HIGH | SET TO LARGE VALUE |

CORRECTION CONTROL APPARATUS, IMAGE CAPTURING APPARATUS, CONTROL METHOD, AND RECORDING MEDIUM

BACKGROUND OF THE INVENTION

Field of the Invention

The present invention relates to a correction control apparatus, an image capturing apparatus, a control method, and a recording medium, and in particular to a technique for correcting an image blur associated with shooting of moving images.

Description of the Related Art

During image capture performed with use of an image capturing apparatus such as a digital video camera, the image quality of captured images that have been obtained could possibly deteriorate (image blur) due to a change in a subject image caused by the movement of the image forming position of the optical image and the motion of a subject during exposure. Here, the image blur caused by the former is categorized as a camera shake, and the image blur caused by the latter is categorized as a motion blur; they are respectively detected by different methods. More specifically, a camera shake is detected based on the output of a sensor, such as an angular velocity sensor provided in an image capturing apparatus, and on motion vectors of a still object (background) within a plurality of captured images that have been obtained intermittently. Also, a motion blur is detected based on motion vectors of a main subject within a plurality of captured images that have been obtained intermittently. These image blurs can be reduced by correction, and optical blur correction methods and electronic blur correction methods are adopted depending on the structure of the image capturing apparatus.

Japanese Patent Laid-Open No. 2007-201534 discloses an image capturing apparatus that has a function of correcting a motion blur and a function of correcting a camera shake; which one of a camera shake and a motion blur is to be detected and corrected varies depending on whether a facial part of a main subject has been detected. More specifically, a motion blur is detected and corrected when a facial part has been detected, whereas a camera shake is detected and corrected when a facial part has not been detected.

Incidentally, in a case where a motion blur has been corrected in shooting of moving images and continuous shooting, the image quality could possibly deteriorate (reduction in the grade of moving images/continuous images). This deterioration in the image quality is presented in a form in which a static subject that is not supposed to be moving, such as a background, appears to be moving, appears to be flickering, and so on; this is attributed to the correction of high-frequency components of a motion blur. That is to say, with the image capturing apparatus of Japanese Patent Laid-Open No. 2007-201534, there is a possibility that moving images and continuous images of a favorable image quality are not output when the face of a main subject has been detected.

SUMMARY OF THE INVENTION

The present invention has been made in view of the aforementioned problem, and provides a correction control apparatus, an image capturing apparatus, a control method, and a recording medium that reduce a motion blur in a favorable mode.

The present invention in its first aspect provides a correction control apparatus that outputs a blur correction amount associated with an image blur with respect to a group of images that have been captured, the correction control apparatus comprising at least one processor and/or circuit configured to function as following units: a first obtainment unit configured to obtain status information indicating an image capture status of the group of images; a second obtainment unit configured to obtain a result of detection of a motion blur with respect to the group of images; an output unit configured to derive the blur correction amount based on the result of detection of the motion blur obtained by the second obtainment unit, and output the blur correction amount; and a control unit configured to control a method of derivation of the blur correction amount by the output unit, wherein the output unit includes a first filter unit that extracts components of a first frequency band from the result of detection of the motion blur, and derives the blur correction amount based on the components of the first frequency band associated with the motion blur extracted by the first filter unit, and the control unit causes the first frequency band extracted by the first filter unit to vary in accordance with the status information obtained by the first obtainment unit.

The present invention in its second aspect provides an image capturing apparatus, comprising: an image capturing unit; a detection unit configured to detect an image blur; the correction control apparatus of the first aspect; and a correction unit configured to perform image blur correction based on the blur correction amount output from the correction control apparatus.

The present invention in its third aspect provides a control method for a correction control apparatus that outputs a blur correction amount associated with an image blur with respect to a group of images that have been captured, the control method comprising: obtaining status information indicating an image capture status of the group of images; obtaining a result of detection of a motion blur with respect to the group of images; extracting components of a first frequency band from the result of detection of the motion blur; deriving the blur correction amount based on the extracted components of the first frequency band associated with the motion blur, and outputting the blur correction amount; and controlling a method of derivation of the blur correction amount in the outputting, wherein in the controlling, the method of derivation is controlled so that the first frequency band extracted from the result of detection of the motion blur varies in accordance with the obtained status information.

The present invention in its fourth aspect provides a computer-readable recording medium including a program recorded therein, the program being intended to cause a computer to function as each unit of the correction control apparatus of the first aspect.

Further features of the present invention will become apparent from the following description of exemplary embodiments (with reference to the attached drawings).

BRIEF DESCRIPTION OF THE DRAWINGS

FIG. 1 is a block diagram exemplarily showing the functional constituents of a digital video camera 100 according to first and second embodiments of the present invention.

FIG. 2 is a diagram for describing image blur correction according to the first embodiment of the present invention.

FIG. 5 is a diagram for describing image blur correction according to the second embodiment of the present invention.

DESCRIPTION OF THE EMBODIMENTS

Figure 3:
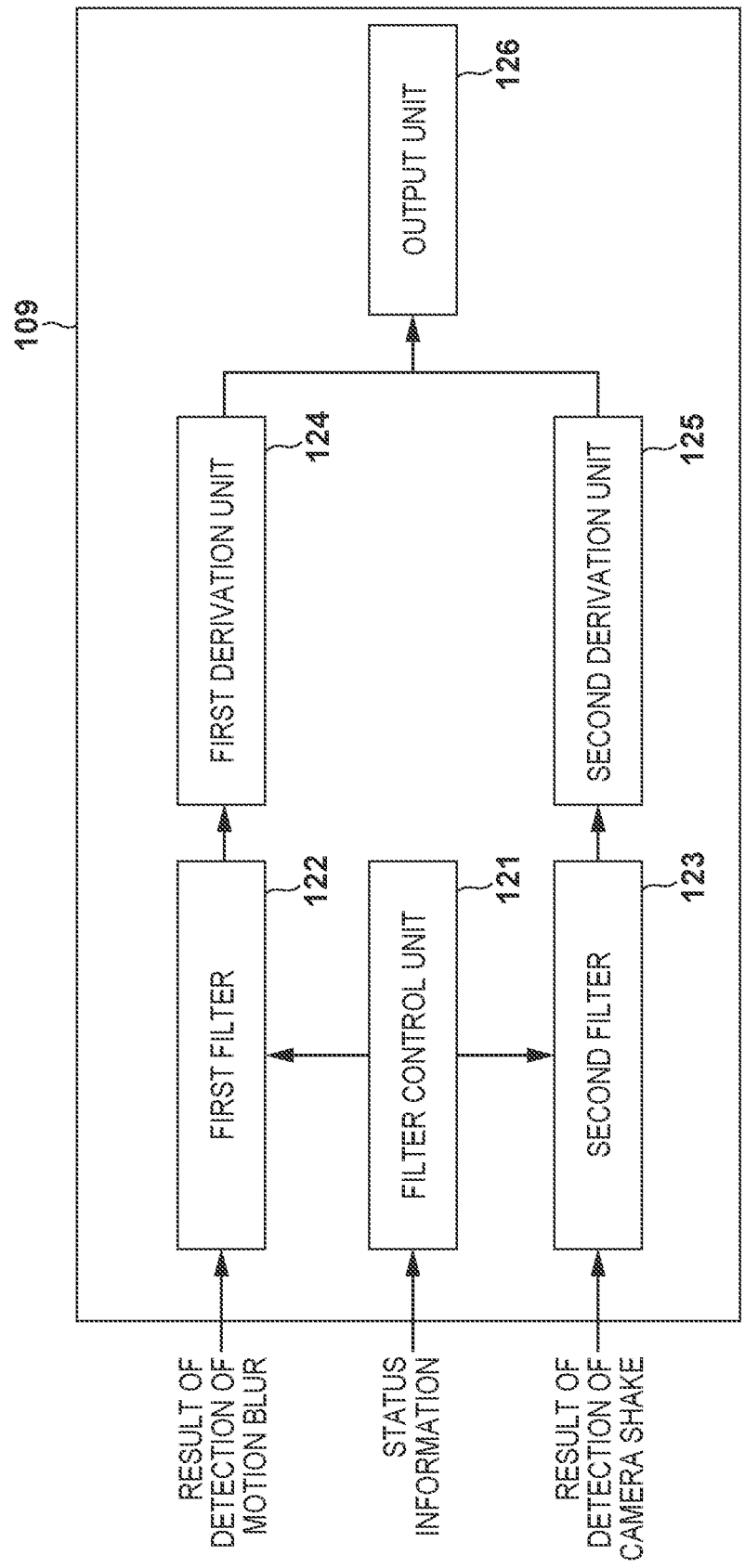
FIG. 3 is a block diagram exemplarily showing the functional constituents of a correction control unit 109 according to the first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

The following one embodiment will be explained as an example in which the present invention is applied to a digital video camera configured to be capable of detecting and correcting a motion blur and a camera shake, which serves as one example of an image capturing apparatus provided with a correction control apparatus. However, the present invention is applicable to any device capable of deriving a blur correction amount associated with an image blur with respect to a group of images that have been captured intermittently.

<<Functional Constituents of Digital Video Camera>>

FIG. 1 is a block diagram showing the functional constituents of a digital video camera 100 according to the present embodiment. In the present embodiment, a digital video camera 100 is in a mode where a lens is integrated therein, and is assumed to support at least continuous shooting of still images or shooting of moving images. However, in embodying the present invention, the digital video camera 100 need not include a lens integrated therein, and may include an interchangeable lens.

A control unit 101 is, for example, a microcomputer, and controls the operations of each block included in the digital video camera 100. Specifically, the control unit 101 controls the operations of each block by reading out operation programs of each block stored in, for example, a recording medium 102, deploying the operation programs to a memory 103, and executing the operation programs.

The recording medium 102 is, for example, a nonvolatile memory, and stores not only the operation programs of each block included in the digital video camera 100, but also parameters and the like necessary for the operations of each block. Also, the recording medium 102 may include a recording apparatus, such as a memory card, and may be configured to be capable of recording still images or moving images obtained through image capture. The memory 103 is, for example, a volatile memory, and functions not only as a region to which the operation programs of each block are deployed, but also as a storage region that temporarily stores intermediate data and the like that have been output through the operations of each block.

An image capturing unit 104 includes, for example, an image sensor such as a CCD or CMOS sensor, and outputs analog image signals associated with captured images by photoelectrically converting the optical images that have been formed on an image capturing surface of the sensor by an image capture optical system 113. The analog image signals output from the image capturing unit 104 are converted into digital image signals (hereinafter simply referred to as images or captured images) by undergoing A/D conversion processing, development processing, and the like in an image processing unit 105. Also, the image processing unit 105 may be configured to be capable of executing other types of image processing with respect to captured images.

Furthermore, the digital video camera 100 according to the present embodiment includes a motion blur detection unit 106 and a camera shake detection unit 107 that respectively detect a motion blur and a camera shake, which are included among image blurs, as constituents that detect the occurrence of image blurs. Based on a group of images that have been captured intermittently, the motion blur detection unit 106 detects a motion blur that has occurred in relation to this group of images. As disclosed above, the detection of a motion blur may be realized by deriving motion vectors of a main subject image in the group of images. Other than this, the detection of a motion blur may be realized by a method in which a subject is detected using a subject detector based on machine learning, and a positional shift between images is regarded as a motion blur. On the other hand, the camera shake detection unit 107 detects a camera shake that the digital video camera 100 experienced while shooting a group of images. The detection of a camera shake may be realized, for example, based on the output of a non-illustrated sensor mounted on the digital video camera 100, such as a gyroscope sensor and an acceleration sensor, or by deriving motion vectors of a still object (background) in a group of images.

Note that in a mode where both of the motion blur detection unit 106 and the camera shake detection unit 107 detect an image blur based on motion vectors of each subject in a group of images, these constituents need not be provided separately. For example, the motions of a main subject and a background may be separated and their respective image blurs may be detected by categorizing the motion vectors obtained based on comparison among a plurality of images based on known histogram processing. Furthermore, the method of detecting a motion blur and a camera shake is not limited to these, and any another method may be adopted.

With respect to a group of images that have been captured intermittently, a configuration unit 108 configures status information indicating the image capturing statuses of this group of images. In the present embodiment, with respect to a group of captured images, the status information includes at least one of contrast values of a background region, the depth of field of the image capture optical system 113 that was set at the time of image capture, the focal length of the image capture optical system 113 that was set at the time of image capture, the rate of occupancy of a main subject region, the degree of tracking of a main subject at the time of image capture, and the degree of reliability of main subject detection. Here, the degree of tracking of a main subject at the time of image capture may be derived based on, for example, the sensor output of an inertia sensor and a positional change of a main subject in the group of images. The degree of tracking of the main subject at the time of image capture may be derived in such a manner that, for example, it is high when the sensor output shows a large amount of motion of the digital video camera 100 while the amount of change in the position of the main subject in the group of images is small. Although the details of status information will be described later, this information is used in the estimation of the degree of importance of a background region in the group of images, and the information included therein is not limited to these. For example, the status information may include information of a user instruction indicating, for example, that the setting of an image capture mode that tracks a main subject and the setting of a subject to be tracked have been configured, in place of the degree of tracking of a main subject at the time of image capture.

A correction control unit 109 derives a blur correction amount with respect to blur correction associated with the detected image blur (image blur correction). Although the detailed configuration will be described later, in the present embodiment, the correction control unit 109 derives a blur correction amount based on the result of detection of a motion blur by the motion blur detection unit 106, the result of detection of a camera shake by the camera shake detection unit 107, and the status information configured by the configuration unit 108. The derived blur correction amount is output to a correction unit 110.

The correction unit 110 performs image blur correction, which is included in the digital video camera 100 of the present embodiment. Although FIG. 1 shows the correction unit 110 as one functional constituent, image blur correction may be provided as a plurality of functional constituents depending on the adopted correction method. That is to say, image blur correction may be performed in accordance with at least one of an optical blur correction method and an electronic blur correction method. In a case where the former correction method is adopted, the correction unit 110 can realize image blur correction by, for example, moving a shift lens, which is included in the image capture optical system 113, in the direction perpendicular to the optical axis based on the blur correction amount, thereby changing the image forming position of an optical image on the image sensor. Alternatively, the correction unit 110 may realize image blur correction by moving the image sensor in the direction perpendicular to the optical axis based on the blur correction amount. Also, in a case where the latter correction method is adopted, the correction unit 110 can realize image blur correction by, for example, controlling the image processing unit 105 to extract signals of regions that show a certain subject image from captured images obtained by the image capturing unit 104 and output the signals.

Note that although the axes along which an image blur is detected and corrected are the pitch axis (Y direction) and the yaw axis (X direction), the present embodiment will be described with regard to a mode where correction is performed with respect to one of these axes in order to facilitate the understanding of the present invention.

A display unit 111 is, for example, a display apparatus such as an LCD, and displays images as necessary based on image signals output from the image processing unit 105. The display unit 111 functions also as an electronic viewfinder by performing through-the-lens display of the signals that have been output through image capture.

An operation input unit 112 is, for example, user interfaces included in the digital video camera 100, such as a shutter release button and switches. Upon detecting an operational input that has been made with respect to a user interface, the operation input unit 112 outputs a corresponding control signal to the control unit 101.

Note that the present embodiment will be described under the assumption that processing is realized by circuits and processors corresponding to respective blocks that are included as items of hardware in the digital video camera 100. However, embodiments of the present invention are not limited to this, and processing of each block may be realized by a program that performs processing similarly to that block.

<<Outline of Image Blur Correction>>

Subsequently, the outline of image blur correction pertaining to the digital video camera 100 of the present embodiment will be described.

As disclosed above, image blur correction in the digital video camera 100 is realized by the correction unit 110 operating based on a blur correction amount derived by the correction control unit 109. In the present embodiment, it is assumed that image blur correction for correcting both of a motion blur and a camera shake at the same time is performed, and a blur correction amount is derived based on both of the result of detection of the motion blur and the result of detection of the camera shake. Therefore, in connection with the derivation of the blur correction amount, the correction control unit 109 obtains these results of detection as inputs.

The correction control unit 109 separates the input results of detection of various types of blurs based on one cutoff frequency, and derives a final blur correction amount by adding up the correction amounts that have been derived respectively for the band that exceeds this cutoff frequency and the band that falls below this cutoff frequency. More specifically, the correction control unit 109 derives a correction amount based on the result of detection of a motion blur for the band that falls below the cutoff frequency, derives a correction amount based on the result of detection of a camera shake for the band that exceeds the cutoff frequency, and derives a blur correction amount by adding them up.

Here, in order to obtain a good correction result with respect to a motion blur, it is favorable to derive a correction amount associated with a motion blur based on the result of detection of a wide range of frequency components; however, as disclosed above, correction of high-frequency components causes deterioration in the image quality. That is to say, in a mode where images that have been captured continuously, such as moving images and continuous images, are presented sequentially, the stability of background regions is impaired between the images by correcting high-frequency components of a motion blur, leading to the possibility of unfavorable presentation. Therefore, in order to prevent a motion blur in a high-frequency band, which causes such deterioration in the image quality, from being corrected, the correction control unit 109 removes components in a band that exceeds the cutoff frequency (low-pass) with respect to the result of detection of a motion blur, then derives a correction amount associated with the motion blur.

On the other hand, it is considered that deterioration in the image quality related to a background region tends to be unproblematic when the degree of importance of this background region is low. That is to say, when the degree of importance of a background region shown in moving images and like is low, even if the high-frequency components of a motion blur have been corrected, changes in the background region attributed thereto are not likely to be conspicuous (not likely to be recognized or draw attention). Therefore, the correction control unit 109 estimates the degree of importance of a background region based on status information associated with the time of image capture, and changes the value of the cutoff frequency to a higher value when the degree of importance is low, thereby enhancing the effect of correction of a motion blur. That is to say, the correction control unit 109 changes the cutoff frequency so that the lower the degree of importance of a background region, the higher the band of frequencies included. More specifically, the correction control unit 109 estimates the degree of importance of a background region as follows based on the status information that has been obtained in association with derivation of a blur correction amount.

For example, in a mode where the status information includes contrast values of a background region, the degree of importance of the background region is estimated in accordance with the magnitudes of these values. More specifically, the lower the contrast values of the background region, as in, for example, the case where the subject in the background is the sky, ocean, lawn, or wall, the less likely it is for the changes in the background region to be conspicuous, and thus the correction control unit 109 estimates that the degree of importance of the background region is low; in contrast, the higher these values, the higher the estimated degree of importance. Therefore, the correction control unit 109 sets a higher cutoff frequency for lower contrast values of the background region, and derives a blur correction amount based on the high-frequency components of the result of detection of a motion blur. Also, the correction control unit 109 sets a lower cutoff frequency for higher contrast values of the background region, and removes high-frequency components of the result of detection of a motion blur in deriving a blur correction amount.

Furthermore, for example, in a mode where the status information includes the depth of field at the time of image capture, the degree of importance of a background region is estimated in accordance with the magnitude of this depth of field. More specifically, the smaller the depth of field at the time of image capture, the less likely it is for the changes in the background region to be conspicuous due to the blurred background, and thus the correction control unit 109 estimates that the degree of importance of the background region is low; in contrast, the larger the depth of field, the higher the estimated degree of importance. Therefore, the correction control unit 109 sets a higher cutoff frequency for a smaller depth of field at the time of image capture, and derives a blur correction amount based on the high-frequency components of the result of detection of a motion blur. Also, the correction control unit 109 sets a lower cutoff frequency for a larger depth of field at the time of image capture, and removes high-frequency components of the result of detection of a motion blur in deriving a blur correction amount.

Furthermore, for example, in a mode where the status information includes the focal length at the time of image capture, the degree of importance of a background region is estimated in accordance with the magnitude of this focal length. More specifically, the longer the focal length at the time of image capture, the more the image capture is considered to have put a focus on the main subject, and thus the correction control unit 109 estimates that the degree of importance of the background region is low; in contrast, the shorter the focal length, the higher the estimated degree of importance. Therefore, the correction control unit 109 sets a higher cutoff frequency for a longer focal length at the time of image capture, and derives a blur correction amount based on the high-frequency components of the result of detection of a motion blur. Also, the correction control unit 109 sets a lower cutoff frequency for a shorter local length at the time of image capture, and removes high-frequency components of the result of detection of a motion blur in deriving a blur correction amount.

Furthermore, for example, in a mode where the status information includes the rate of occupancy of a main subject region, the degree of importance of a background region is estimated in accordance with the magnitude of this rate of occupancy. More specifically, the higher the rate of occupancy of the main subject region, the more the image capture is considered to have put a focus on the main subject, and thus the correction control unit 109 estimates that the degree of importance of the background region is low; in contrast, the lower the rate of occupancy, the higher the estimated degree of importance. Therefore, the correction control unit 109 sets a higher cutoff frequency for a higher rate of occupancy of a main subject region, and derives a blur correction amount based on the high-frequency components of the result of detection of a motion blur. Also, the correction control unit 109 sets a lower cutoff frequency for a lower rate of occupancy of a main subject region, and removes high-frequency components of the result of detection of a motion blur in deriving a blur correction amount.

Furthermore, for example, in a mode where the status information includes the degree of tracking of a main subject at the time of image capture, the degree of importance of a background region is estimated based on the magnitude of this degree of tracking. More specifically, the higher the degree of tracking of the main subject at the time of image capture, the more the image capture is considered to have put a focus on the main subject, and thus the correction control unit 109 estimates that the degree of importance of the background region is low; in contrast, the lower the degree of tracking, the higher the estimated degree of importance. Therefore, the correction control unit 109 sets a higher cutoff frequency for a higher degree of tracking of a main subject at the time of image capture, and derives a blur correction amount based on the high-frequency components of the result of detection of a motion blur. Also, the correction control unit 109 sets a lower cutoff frequency for a lower degree of tracking of a main subject at the time of image capture, and removes high-frequency components of the result of detection of a motion blur in deriving a blur correction amount.

Furthermore, for example, in a mode where the status information includes the degree of reliability of main subject detection, the degree of importance of a background region is estimated based on the magnitude of this degree of reliability. More specifically, the correction control unit 109 estimates that the higher the degree of reliability of main subject detection, the higher the degree of importance of a main subject region, and relatively, the lower the degree of importance of the background region; the correction control unit 109 estimates that the lower the degree of reliability of main subject detection, the lower the degree of importance of the main subject region, and relatively, the higher the degree of importance of the background region. Therefore, the correction control unit 109 sets a higher cutoff frequency for a higher degree of reliability of main subject detection, and derives a blur correction amount based on the high-frequency components of the result of detection of a motion blur. Also, the correction control unit 109 sets a lower cutoff frequency for a lower degree of reliability of main subject detection, and removes high-frequency components of the result of detection of a motion blur in deriving a blur correction amount.

Furthermore, although no particular restriction is set with regard to the method of obtainment of the degree of reliability of main subject detection, in detecting a motion blur using motion vectors, for example, a high degree of reliability is set for a high degree of coincidence of a main subject between images, and a low degree of reliability is set for a low degree of coincidence of a main subject. Examples of a low degree of coincidence of a main subject include a subject with repeated patterns, a subject that significantly changes in shape between images, and so on. In subject detection based on machine learning, it is sufficient that a detection score of a subject output from a detector be used, as is, as the degree of reliability of a main subject.

In sum, the above-described estimation of the degree of importance of a background region and control on the cutoff frequency based on the status information are represented by the relationship shown in FIG. 2.

Also, in a mode where the status information includes a plurality of types of information described above, these types of information may be combined in determining the cutoff frequency to be set. For example, the cutoff frequency may be an average value of cutoff frequencies that have been determined separately based on various types of information, may be a weighted average value based on the degrees of importance that have been respectively set for the types, or may be determined based on the type of information with the highest degree of priority. For example, in a case where the cutoff frequencies that are selected respectively for three types of information included in the status information are Fc1, Fc2, and Fc3, the cutoff frequency Fc to be ultimately set may be derived as follows based on the weights W1, W2, and W3 of the respective types.

$$Fc = W1 \times Fc1 + W2 \times Fc2 + W3 \times Fc3$$

Here, for example, it is preferable to place priority on the degree of reliability of subject detection over other types of status information. Furthermore, it is preferable to place priority on the contrast in a background region and the degree of tracking of a main subject over the rate of occupancy of a main subject region and the focal length at the time of image capture. Alternatively, for example, in a mode where a higher degree of priority is set for the degree of tracking of a main subject at the time of image capture than for the focal length at the time of image capture, the cutoff frequency selected based on the degree of tracking of the main subject at the time of image capture may be set irrespective of the magnitude of the focal length. That is to say, for example, while a low cutoff frequency is set in a case where the focal length at the time of image capture is short, a high cutoff frequency may be set if the degree of tracking of a main subject at the time of image capture is high.

Note that although the present embodiment is described under the assumption that the correction control unit 109 obtains the status information configured by the configuration unit 108 as an input associated with the derivation of a blur correction amount, embodiments of the present invention are not limited to this. For example, the correction control unit 109 may obtain information that has been used in deriving various types of information that have been exemplarily presented above as the status information, and derive similar types of information.

Furthermore, although the present embodiment is described under the assumption that the degree of importance of a background region is estimated based on the status information and the cutoff frequency is controlled based on the result of this estimation, embodiments of the present invention are not limited to this. That is to say, the estimation based on the status information is not limited to being performed only with respect to the degree of importance of a background region; for example, the estimation may be performed with respect to different standards, such as the extent at which changes in a subject in a background region are not likely to be conspicuous, and the degree at which the image capture puts a focus on a main subject.

<Functional Constituents of Correction Control Unit>

The following describes the functional constituents associated with derivation of a blur correction amount in the correction control unit 109 with use of a block diagram of FIG. 3. As shown in the figure, at the time of derivation, the correction control unit 109 obtains, as inputs, the result of detection of a motion blur by the motion blur detection unit 106, the result of detection of a camera shake by the camera shake detection unit 107, and the status information configured by the configuration unit 108.

A filter control unit 121 determines a cutoff frequency based on the status information, and sets the cutoff frequency on a first filter 122 and a second filter 123. The first filter 122 is a filter that is applied to the result of detection of a motion blur, and removes the high-frequency components of the motion blur based on the cutoff frequency that has been set. That is to say, the first filter 122 is a low-pass filter (high-cut filter) that is configured to be capable of blocking different high-frequency bands depending on the setting of the cutoff frequency configured by the filter control unit 121. On the other hand, the second filter 123 is a filter that is applied to the result of detection of a camera shake, and removes low-frequency components of the camera shake based on the cutoff frequency that has been set. That is to say, the second filter 123 is a high-pass filter (low-cut filter) that is configured to be capable of blocking different low-frequency bands depending on the setting of the cutoff frequency configured by the filter control unit 121.

Note that in view of the separation of the frequency band to be corrected preferentially with respect to each of the motion blur and the camera shake, the present embodiment is described under the assumption that the filter control unit 121 sets the same cutoff frequency on the first filter 122 and the second filter 123. However, embodiments of the present invention are not limited to this, and different cutoff frequencies may be set on the first filter 122 and the second filter 123 as long as they are substantially the same. That is to say, it is sufficient that the frequency band extracted by the first filter 122 (a first frequency band) and the frequency band extracted by the second filter 123 (a second frequency band) at least include different bands.

Based on the components of the result of detection of the motion blur in the first frequency band extracted by the first filter 122, a first derivation unit 124 derives a correction amount associated with the motion blur. More specifically, the first derivation unit 124 integrates the low-frequency components associated with the motion blur extracted by the first filter 122, thereby deriving a correction amount associated with the motion blur.

Based on the components of the result of detection of the camera shake in the second frequency band extracted by the second filter 123, a second derivation unit 125 derives a correction amount associated with the camera shake. More specifically, the second derivation unit 125 integrates the high-frequency components associated with the camera shake extracted by the second filter 123, thereby deriving a correction amount associated with the camera shake.

An output unit 126 derives a final blur correction amount by adding up the correction amount associated with the motion blur derived by the first derivation unit 124 and the correction amount associated with the camera shake derived by the second derivation unit 125, and then outputs the final blur correction amount. Therefore, the blur correction amount output from the output unit 126 is configured so that the camera shake is corrected in the high-frequency band and the motion blur is corrected in the low-frequency band based on the cutoff frequency. The blur correction amount output from the output unit 126 is used in image blur correction performed by the correction unit 110.

<<Image Blur Correction Processing>>

Figure 4:
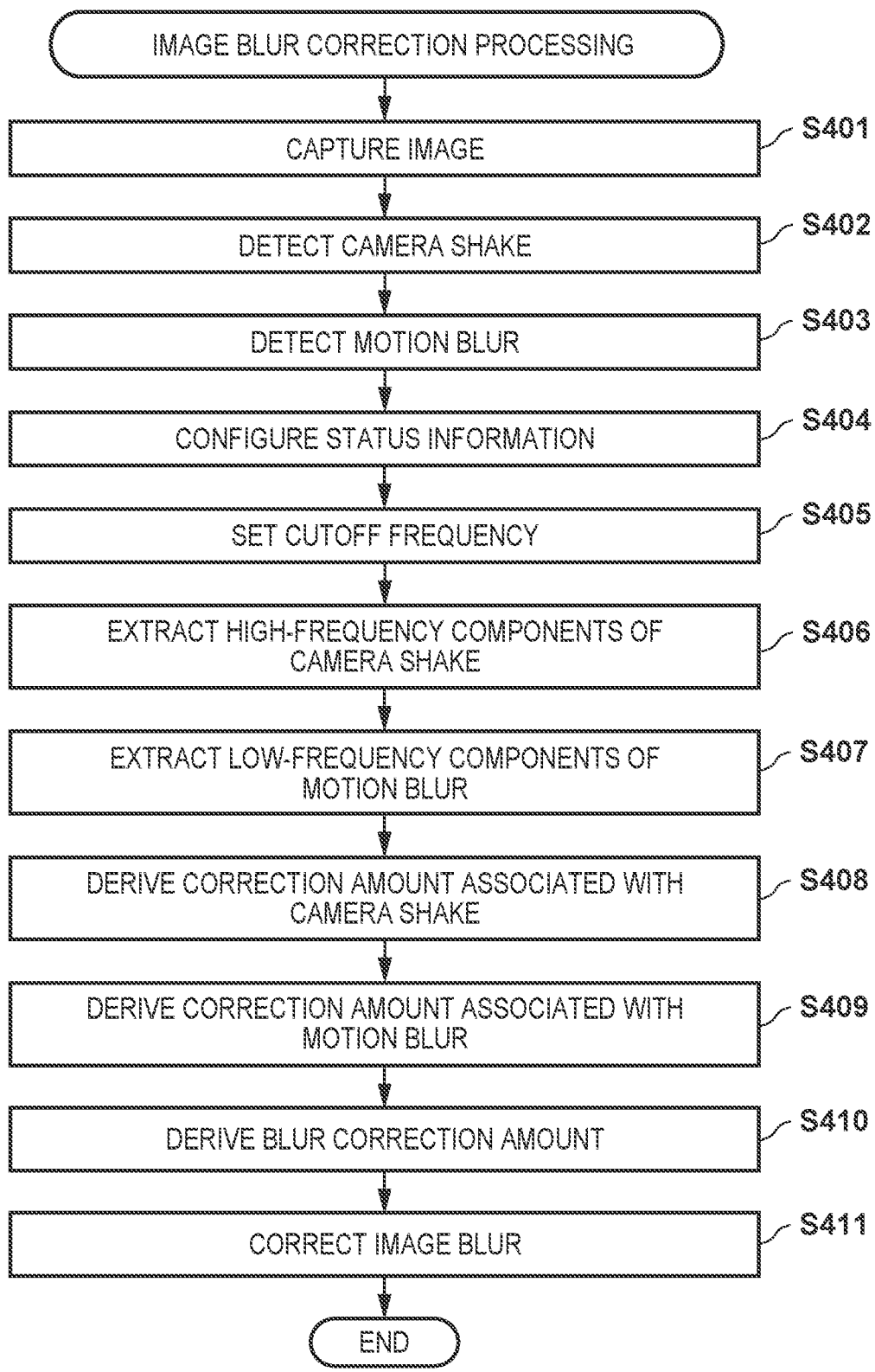
FIG. 4 is a flowchart exemplarily showing image blur correction processing executed by the digital video camera 100 according to the first embodiment of the present invention.

Next, with use of the flowchart of FIG. 4, specific processing will be described with regard to image blur correction processing that is executed by the digital video camera 100 of the present embodiment configured in the foregoing manner. Processing corresponding to this flowchart can be realized by, for example, the control unit 101 reading out a corresponding processing program stored in the recording medium 102, deploying the program to the memory 103, and executing the program. The present image blur correction processing will be described under the assumption that it is started, for example, when moving images are captured or still images are continuously captured, or when images are captured in association with live-view display, on the digital video camera 100. Furthermore, the present image blur correction processing may be executed in accordance with, for example, the frame rate of image capture, and it is assumed that a blur correction amount is derived in connection with image capture associated with one frame, and the correction unit 110 performs image blur correction based on this blur correction amount.

Note that although the processing is ordered using step numbers in the following description for the sake of convenience of explanation, it is to be easily understood that a part of the processing can be executed in parallel and no limitation is intended by the order of the figure.

In step S401, under control of the control unit 101, the image capturing unit 104 performs image capture associated with the present frame. The image processing unit 105 converts image signals obtained through the image capture into a captured image in the form of digital data.

In step S402, under control of the control unit 101, the camera shake detection unit 107 detects a camera shake experienced by the digital video camera 100 at the time of image capture, and outputs the result of detection of the camera shake.

In step S403, under control of the control unit 101, the motion blur detection unit 106 detects a motion blur based on comparison between a captured image associated with the present frame and a captured image associated with a previous frame (an immediately preceding frame or a frame that further precedes the same), and outputs the result of detection of the motion blur.

In step S404, under control of the control unit 101, the configuration unit 108 configures status information with respect to the image capture associated with the present frame. The status information may include at least one of the four types of information described earlier.

In step S405, the filter control unit 121 of the correction control unit 109 estimates the degree of importance of a background region based on the status information, and determines a cutoff frequency based on the result of this estimation. Then, the filter control unit 121 sets the determined cutoff frequency on the first filter 122 and the second filter 123.

In step S406, the second filter 123 of the correction control unit 109 removes low-frequency components of the result of detection of the camera shake based on the cutoff frequency, thereby extracting high-frequency components.

In step S407, the first filter 122 of the correction control unit 109 removes high-frequency components of the result of detection of the motion blur based on the cutoff frequency, thereby extracting low-frequency components.

In step S408, the second derivation unit 125 of the correction control unit 109 integrates the high-frequency components of the result of detection of the camera shake extracted by the second filter 123, thereby deriving a correction amount associated with the camera shake.

In step S409, the first derivation unit 124 of the correction control unit 109 integrates the low-frequency components of the result of detection of the motion blur extracted by the first filter 122, thereby deriving a correction amount associated with the motion blur.

In step S410, the output unit 126 of the correction control unit 109 derives a final blur correction amount by adding the correction amount associated with the motion blur derived in step S409 to the correction amount associated with the camera shake derived in step S408, and then outputs the final blur correction amount.

In step S411, under control of the control unit 101, the correction unit 110 performs image blur correction associated with the present frame based on the blur correction amount output in step S410. As disclosed above, image blur correction performed in the present step is carried out using a method adopted by the digital video camera 100, such as an optical blur correction method and an electronic blur correction method.

In this way, setting a high cutoff frequency in a case where the degree of importance of a background region is estimated to be low can enhance the effect of correction of the motion blur while suppressing the impression of deterioration of the image quality in the background region. Furthermore, setting a low cutoff frequency in a case where the degree of importance of a background region is not estimated to be low can attenuate the effect of correction of the motion blur and reduce the occurrence of deterioration of the image quality in the background region.

Note that although the present embodiment has been described in relation to a mode where the cutoff frequency is changed so that the lower the estimated degree of importance of the background region, the higher the band of frequencies included, embodiments of the present invention are not limited to this. That is to say, the cutoff frequency to be set need not be determined linearly in accordance with the degree of importance of the background region; the cutoff frequency may be changed to a high value in a stepwise manner in accordance with whether the degree of importance falls below a threshold that has been determined in advance with respect to the degree of importance.

Second Embodiment

The above embodiment has been described with regard to a mode that separates the frequency band in which correction associated with a motion blur is performed and the frequency band in which correction associated with a camera shake is performed, using a cutoff frequency that has been dynamically set based on the status information. In other words, the first embodiment has been described with regard to a mode that causes the cutoff frequency to vary depending on the result of estimation of the degree of importance of a background region based on the status information, thereby causing the degree of correction of high-frequency components of a motion blur to vary; however, embodiments of the present invention are not limited to this. That is to say, the reduction in the occurrence of deterioration of the image quality in the background region attributed to correction of high-frequency components of a motion blur is not limited to being realized by the method that dynamically sets a cutoff frequency for removing such high-frequency components. For example, while a correction amount associated with a motion blur including high-frequency components (a first blur correction amount) is derived, the reduction may be realized by reducing the weight of this first blur correction amount and combining this first blur correction amount in deriving a final blur correction amount. In other words, the object of the present invention can be achieved also by changing the degree of contribution of a correction amount associated with a motion blur to a final blur correction amount in accordance with the status information.

<<Outline of Image Blur Correction>>

The following describes the outline of image blur correction pertaining to the digital video camera 100 of the present embodiment.

In the present embodiment, similarly to the first embodiment, the correction control unit 109 separates the input results of detection of various types of blurs based on one cutoff frequency, and derives a final blur correction amount by adding up the correction amounts that have been derived respectively for the band that exceeds this cutoff frequency and the band that falls below this cutoff frequency. Here, the cutoff frequency in the present embodiment is fixed, and is a frequency that has been set in order to remove a high-frequency band with which, for example, a motion blur is not likely to occur, or a good correction result cannot be obtained even if a motion blur has been corrected, from the result of detection of a motion blur. Therefore, with respect to a band that falls below the predetermined cutoff frequency, the correction control unit 109 adds up a correction amount based on the result of detection of a motion blur (a first blur correction amount) and a correction amount based on the result of detection of a camera shake (a second blur correction amount), thereby deriving the result of the addition as a correction amount associated with this band. At this time, as will be described later, weighted addition of the first blur correction amount and the second blur correction amount is performed based on the status information. Also, with respect to a band that exceeds the predetermined cutoff frequency, the correction control unit 109 derives a correction amount based solely on the result of detection of a camera shake (a third blur correction amount) as a correction amount associated with this band. Then, the correction control unit 109 derives a final blur correction amount by adding up these correction amounts associated with the two types of bands.

That is to say, in the correction control unit 109 of the present embodiment, a motion blur is reflected only in a correction amount associated with the band that falls below the predetermined cutoff frequency, and this correction amount is derived by aggregating camera shakes in this band. Therefore, in deriving this correction amount, it is possible to cause the degree of correction of high-frequency components of a motion blur in image blur correction to vary by controlling which one of a correction amount associated with the motion blur and a correction amount associated with the camera shake is given more weight.

This weight control is performed based on the status information. In a case where the degree of importance of a background region estimated based on the status information is low, even if the weight of the correction amount associated with a motion blur is increased, changes in the background region attributed thereto (deterioration in the image quality) are not likely to be conspicuous. In contrast, in a case where the degree of importance of a background region is high, if the weight of the correction amount associated with a motion blur is increased, changes in the background region attributed thereto become more conspicuous. Therefore, with respect to the frequency band that falls below the predetermined cutoff frequency, the correction control unit 109 performs weighted addition of the first blur correction amount derived from components of a motion blur in this band and the second blur correction amount derived from components of a camera shake in this band based on the result of estimation.

For example, provided that the first blur correction amount is O_low, the second blur correction amount is S_low, and the gain for a camera shake based on the degree of importance of a background region is G, it is sufficient to derive a correction amount X_low associated with the frequency band that falls below the predetermined cutoff frequency as follows.

$$X\_low = S\_low \times G + O\_low \times (1-G)$$

Here, the gain G satisfies $0 \leq G \leq 1$, and a smaller value is set thereas for a lower degree of importance of the background region, whereas a larger value is set thereas for a higher degree of importance. That is to say, in a case where the degree of importance of the background region is low, the deterioration of the image quality in the background region is not likely to be conspicuous even if the degree of correction of a motion blur is increased, and thus the gain G is set to have a small value so as to attenuate the effect of correction of a camera shake and enhance the effect of correction of a motion blur. On the other hand, in a case where the degree of importance of the background region is high, the deterioration of the image quality in the background region could possibly become conspicuous if the degree of correction of a motion blur is increased, and thus the gain G is set to have a large value so as to enhance the effect of correction of a camera shake and attenuate the effect of correction of a motion blur. Here, in sum, estimation of the degree of importance of a background region and control on the gain based on the status information are represented by the relationship shown in FIG. 5.

Note that in a mode where the status information includes a plurality of types of information, these types of information may be combined in determining the gain G. For example, the gain G may be an average value of Gs that have been determined individually based on various types of information, may be a weighted average value based on the degrees of importance that have been set respectively for the types, or may be determined based on the type of information with the highest degree of priority. For example, in a case where the gains that are determined respectively for three types of information included in the status information are G1, G2, and G3, the gain G may be derived as follows based on the weights W1, W2, and W3 of the respective types.

$$G = W1 \times G1 + W2 \times G2 + W3 \times G3$$

Alternatively, for example, in a mode where a higher degree of priority is set for the degree of tracking of a main subject at the time of image capture than for the focal length at the time of image capture, the gain G may be determined based on the degree of tracking of the main subject at the time of image capture irrespective of the magnitude of the focal length. That is to say, for example, a large value may be determined as the gain G in a case where the focal length at the time of image capture is short, whereas a small value may be determined as the gain G in a case where the degree of tracking of a main subject at the time of image capture is high.

Also, although the present embodiment is described with regard to a mode where the gain G is set so that the higher the estimated degree of importance of a background region, the stronger the effect of correction of a camera shake, and the weaker the effect of correction of a motion blur, embodiments of the present invention are not limited to this. That is to say, the gain G to be set need not be determined linearly in accordance with the degree of importance of the background region; the gain G may be changed to a high value in a stepwise manner in accordance with whether the degree of importance exceeds a threshold that has been determined in advance with respect to the degree of importance.

Note that in a mode where the correction amount X_low associated with the frequency band that falls below the predetermined cutoff frequency is derived using the aforementioned expression, a final blur correction amount X can be derived as follows using the third blur correction amount S_high.

$$X = S\_high + S\_low \times G + O\_low \times (1 - G)$$

<Functional Constituents of Correction Control Unit>

Figure 6:
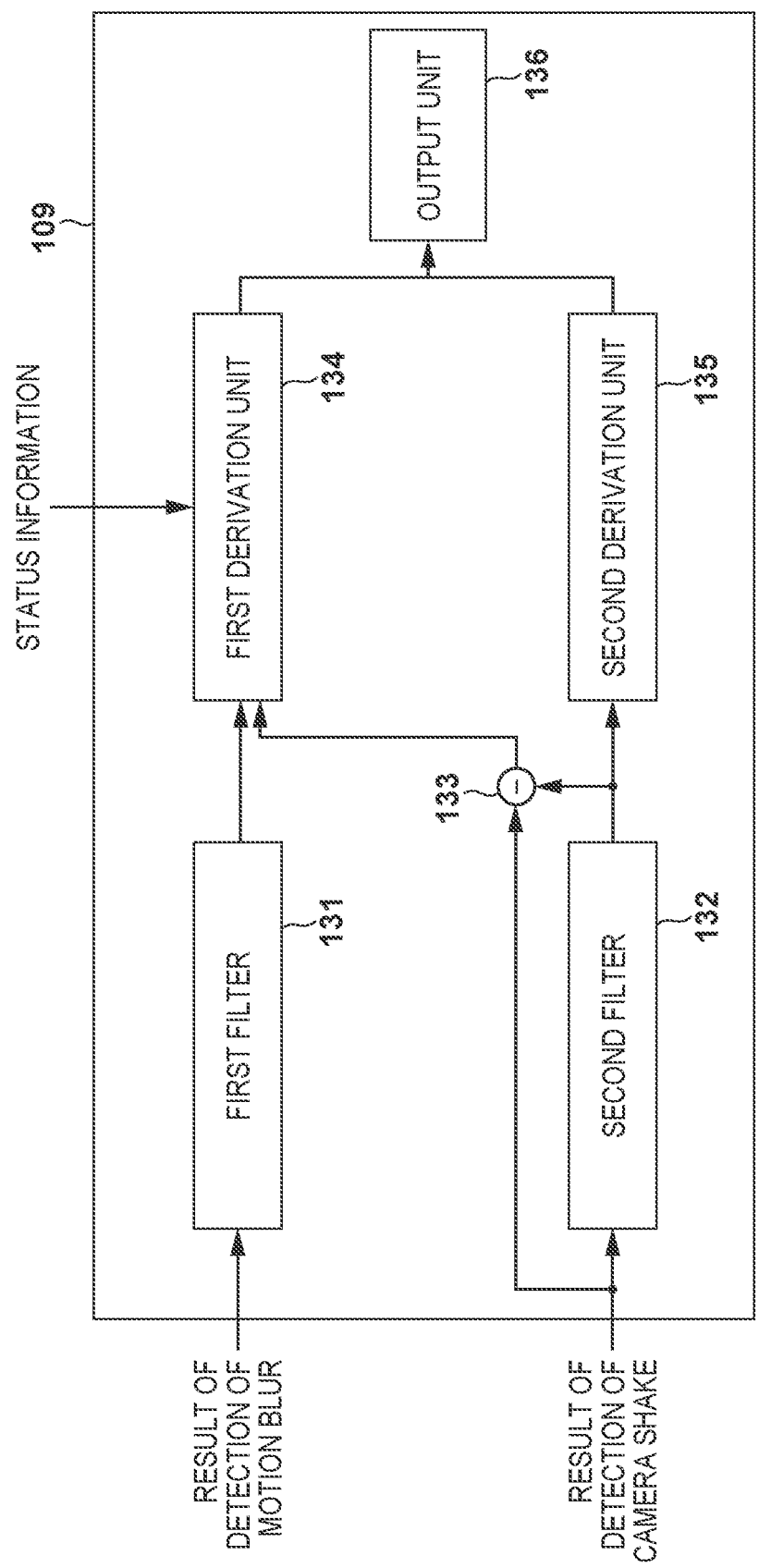
FIG. 6 is a block diagram exemplarily showing the functional constituents of the correction control unit 109 according to the second embodiment of the present invention.

The following describes the functional constituents associated with derivation of a blur correction amount in the correction control unit 109 with use of a block diagram of FIG. 6. As shown in the figure, at the time of derivation, the correction control unit 109 obtains, as inputs, the result of detection of a motion blur by the motion blur detection unit 106, the result of detection of a camera shake by the camera shake detection unit 107, and the status information configured by the configuration unit 108.

A first filter 131 is a filter that is applied to the result of detection of a motion blur, and removes high-frequency components of the motion blur based on the predetermined cutoff frequency. That is to say, the first filter 131 is a low-pass filter (high-cut filter) that passes a fixed low-frequency band based on the predetermined cutoff frequency.

A second filter 132 is a filter that is applied to the result of detection of a camera shake, and removes low-frequency components of the camera shake based on the predetermined cutoff frequency. That is to say, the second filter 132 is a high-pass filter (low-cut filter) that passes a fixed high-frequency band based on the predetermined cutoff frequency.

A subtractor 133 subtracts the output of the second filter 132, that is to say, signals with low-frequency components removed therefrom, from the result of detection of the camera shake. That is to say, combining the second filter 132 and the subtractor 133 can realize a low-pass filter that passes a fixed low-frequency band based on the predetermined cutoff frequency among the result of detection of the camera shake.

Note that in view of combining of the first blur correction amount associated with the motion blur and the second blur correction amount associated with the camera shake with respect to a specific frequency band, the present embodiment is described under the assumption that the same predetermined cutoff frequency is used for the first filter 131 and the second filter 132. However, embodiments of the present invention are not limited to this, and different cutoff frequencies may be set on the first filter 131 and the second filter 132 as long as they are substantially the same. That is to say, it is sufficient that the frequency band extracted by the first filter 131 (the first frequency band) and the frequency band extracted by the second filter 132 (the second frequency band) at least include different bands.

A first derivation unit 134 derives a correction amount associated with the first frequency band based on the components of the result of detection of the motion blur in the first frequency band extracted by the first filter 131, and on the components of the result of detection of the camera shake in the same band extracted by the subtractor 133. More specifically, the first derivation unit 134 integrates the low-frequency components associated with the motion blur extracted by the first filter 131, thereby deriving the first blur correction amount associated with the motion blur. Also, the first derivation unit 134 integrates the low-frequency components associated with the camera shake extracted by the subtractor 133, thereby deriving the second blur correction amount associated with the camera shake. Then, the first derivation unit 134 derives a correction amount associated with the first frequency band by performing weighted addition of the foregoing blur correction amounts based on the status information.

Based on the components of the result of detection of the camera shake in the second frequency band extracted by the second filter 132, a second derivation unit 135 derives a correction amount associated with the second frequency band (the third blur correction amount). More specifically, the second derivation unit 135 integrates the high-frequency components associated with the camera shake extracted by the second filter 132, thereby deriving the third blur correction amount.

An output unit 136 derives a final blur correction amount by adding up the correction amount associated with the first frequency band derived by the first derivation unit 134 and the correction amount associated with the second frequency band derived by the second derivation unit 135 (the third blur correction amount), and then outputs the final blur correction amount. Therefore, the blur correction amount output from the output unit 136 is configured so that, based on the predetermined cutoff frequency, a camera shake is corrected in the second frequency band, and a motion blur and a camera shake are corrected in the first frequency band in accordance with a combination rate corresponding to the status information. The blur correction amount output from the output unit 136 is used in image blur correction performed by the correction unit 110.

<<Image Blur Correction Processing>>

Figure 7:
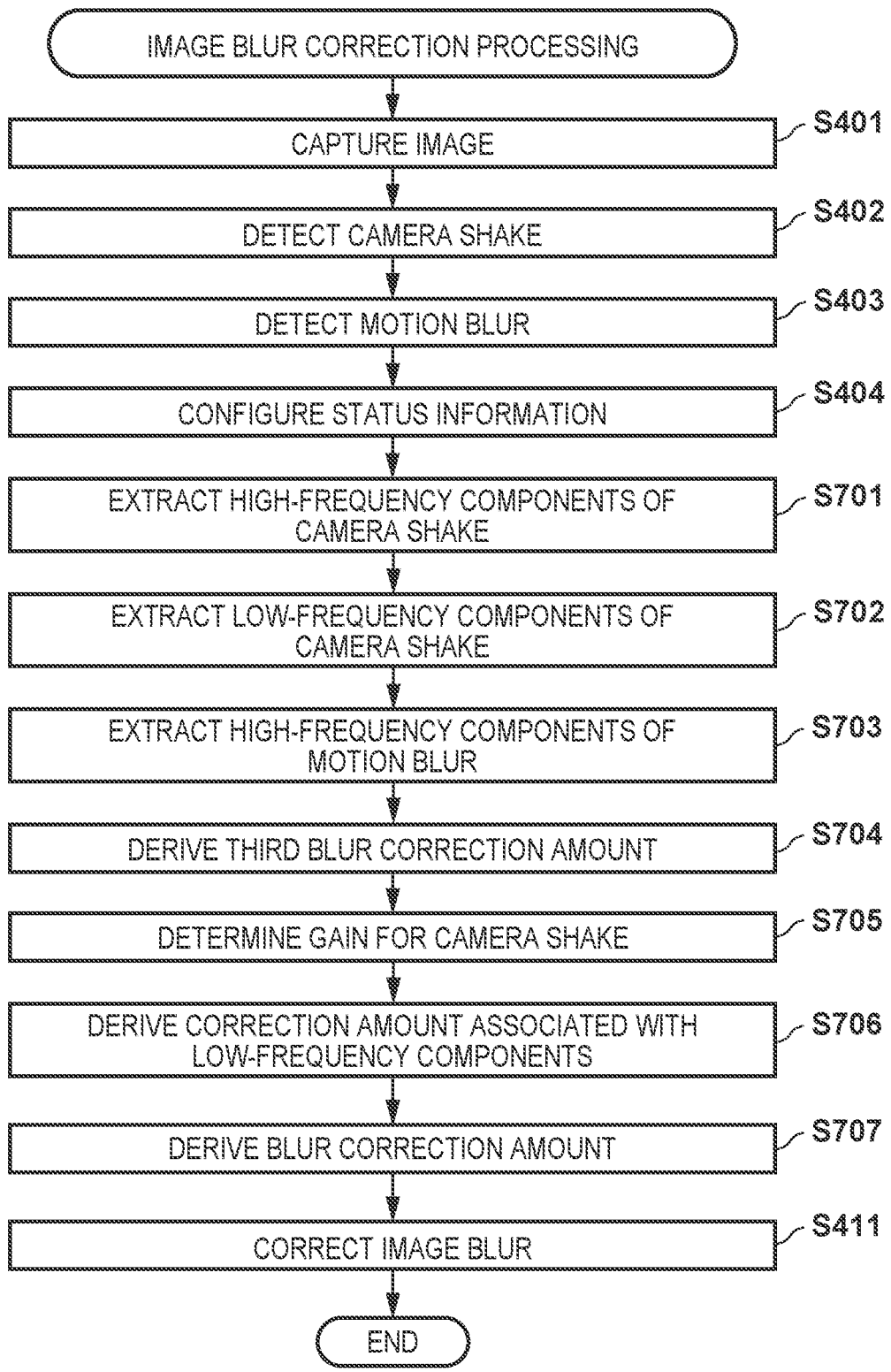
FIG. 7 is a flowchart exemplarily showing image blur correction processing executed by the digital video camera 100 according to the second embodiment of the present invention.

Next, with use of the flowchart of FIG. 7, specific processing will be described with regard to image blur correction processing that is executed by the digital video camera 100 of the present embodiment configured in the foregoing manner. Processing corresponding to this flowchart can be realized by, for example, the control unit 101 reading out a corresponding processing program stored in the recording medium 102, deploying the program to the memory 103, and executing the program. The present image blur correction processing will be described under the assumption that it is started, for example, when moving images are captured or still images are continuously captured, or when images are captured in association with live-view display, on the digital video camera 100. Furthermore, the present image blur correction processing may be executed in accordance with, for example, the frame rate of image capture, and it is assumed that a blur correction amount is derived in connection with image capture associated with one frame, and the correction unit 110 performs image blur correction based on this blur correction amount.

Note that although the processing is ordered using step numbers in the following description for the sake of convenience of explanation, it is to be easily understood that a part of the processing can be executed in parallel and no limitation is intended by the order of the figure. Furthermore, in the image blur correction processing of the present embodiment, with regard to the steps that perform processing similar to the image blur correction processing of the first embodiment, the same reference numerals are added thereto and a description thereof is omitted; the following describes only processing that is unique to the present embodiment.

Once the status information has been configured in step S404, the second filter 132 of the correction control unit 109 removes low-frequency components of the result of detection of the camera shake based on the predetermined cutoff frequency, thereby extracting high-frequency components in step S701.

In step S702, the subtractor 133 of the correction control unit 109 subtracts the high-frequency components of the camera shake extracted in step S701 from the result of detection of the camera shake, thereby extracting low-frequency components of the camera shake.

In step S703, the first filter 131 of the correction control unit 109 removes high-frequency components of the result of detection of the motion blur based on the predetermined cutoff frequency, thereby extracting low-frequency components.

In step S704, the second derivation unit 135 of the correction control unit 109 derives the third blur correction amount, which is intended to correct the high-frequency components of the camera shake, by integrating the high-frequency components of the result of detection of the camera shake extracted by the second filter 132.

In step S705, the first derivation unit 134 of the correction control unit 109 estimates the degree of importance of a background region based on the status information, and determines a gain associated with the low-frequency components of the camera shake based on the result of this estimation.

In step S706, the first derivation unit 134 of the correction control unit 109 derives a correction amount for correcting the low-frequency components of the motion blur and the camera shake. More specifically, the first derivation unit 134 integrates the low-frequency components of the result of detection of the motion blur extracted by the first filter 131, thereby deriving the first blur correction amount associated with the motion blur. Also, the first derivation unit 134 integrates the low-frequency components of the result of detection of the camera shake extracted by the subtractor 133, thereby deriving the second blur correction amount associated with the camera shake. Then, the first derivation unit 134 derives a correction amount for correcting the low-frequency components of the motion blur and the camera shake by combining the first blur correction amount and the second blur correction amount based on the gain determined in step S705.

Note that the image blur correction processing of the present embodiment is described under the assumption that a correction amount is obtained by combining, through weighted addition, the first blur correction amount and the second blur correction amount that have been obtained respectively by integrating the low-frequency components of the motion blur and the low-frequency components of the camera shake based on the gain. However, embodiments of the present invention are not limited to this, and it is possible to adopt a method whereby, for example, the low-frequency components of the motion blur and the low-frequency components of the camera shake are combined through weighted addition based on the gain, and a correction amount is obtained by integrating the combined signals obtained.

In step S707, the output unit 136 of the correction control unit 109 derives a final blur correction amount by adding the correction amount derived in step S706 to the third correction amount derived in step S704, and then outputs the final blur correction amount.

In this way, in a case where the degree of importance of a background region is estimated to be low, increasing the degree of contribution of low-frequency components associated with a motion blur can enhance the effect of correction of the motion blur while suppressing the impression of deterioration of the image quality in the background region. Furthermore, in a case where the degree of importance of a background region is not estimated to be low, reducing the degree of contribution of low-frequency components associated with a motion blur can attenuate the effect of correction of the motion blur and reduce the occurrence of deterioration of the image quality in the background region.

Third Embodiment

The first embodiment has been described with regard to a mode that causes the cutoff frequency of a filter that processes the result of detection of a motion blur to vary based on the status information, thereby causing the degree of correction of high-frequency components of the motion blur to vary. Also, the second embodiment has been described with regard to a mode that causes the degree of correction of a motion blur to vary by changing the weight of the first blur correction amount based on the status information and combining the first blur correction amount.

Figure 8:
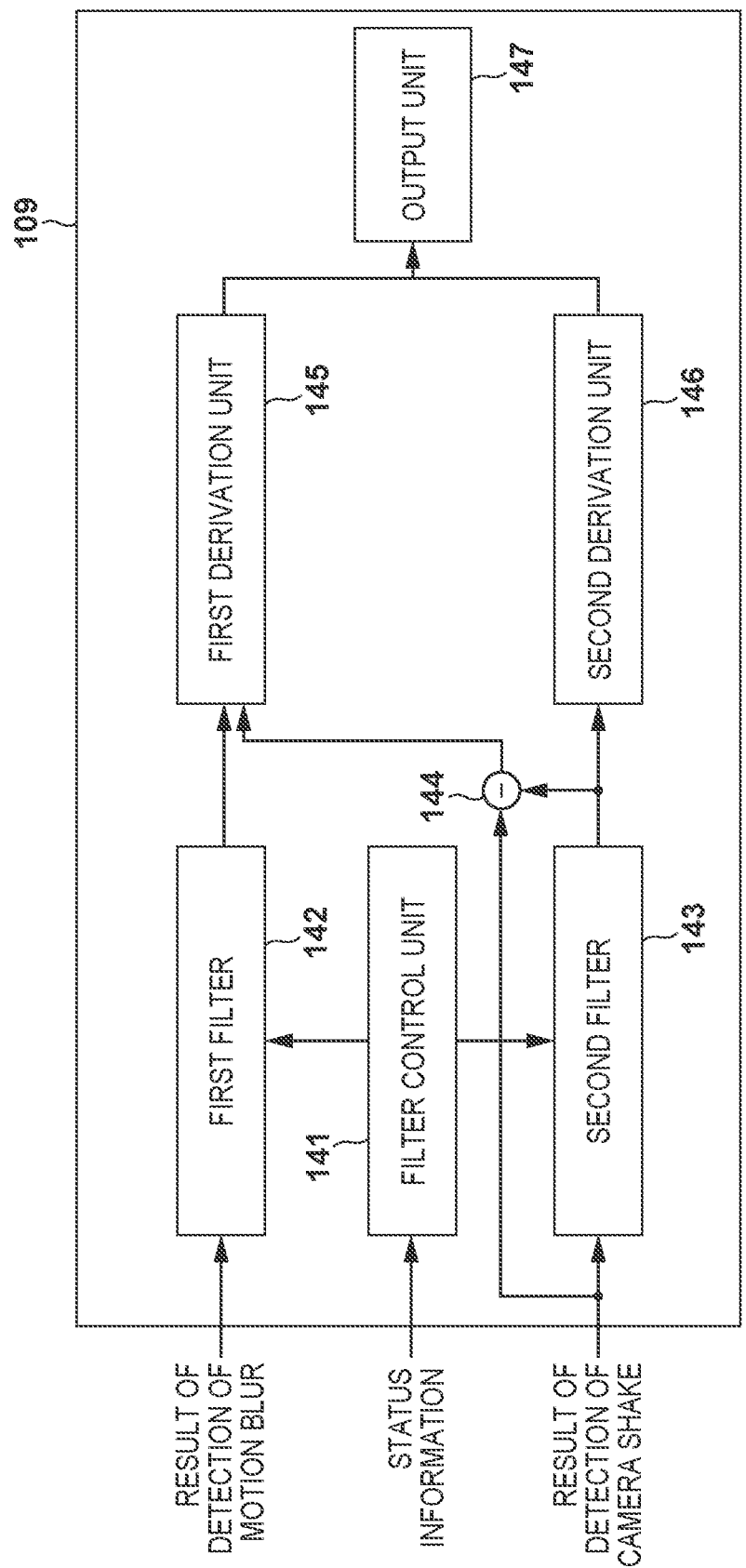
FIG. 8 is a block diagram exemplarily showing the functional constituents of the correction control unit 109 according to a third embodiment of the present invention.

The present embodiment will be described with regard to a mode where the first embodiment and the second embodiment are combined. The correction control unit 109 of the present embodiment differs from the second embodiment in that the cutoff frequency for separating the input results of detection of various types of blurs varies based on the status information. Therefore, the functional constituents associated with derivation of a blur correction amount in the correction control unit 109 associated with the present embodiment are represented by the constituents shown in the block diagram of FIG. 8. Here, a filter control unit 141 determines a cutoff frequency based on the input status information, and sets the cutoff frequency on a first filter 142 and a second filter 143.

Similarly to the second embodiment, with respect to a band that falls below the cutoff frequency, the correction control unit 109 adds up a correction amount (a first blur correction amount) based on the result of detection of a motion blur (the output of the first filter 142) and a correction amount (a second blur correction amount) based on the result of detection of a camera shake (the output of the subtractor 144) in a first derivation unit 145, thereby deriving the result of the addition as a correction amount associated with this band. Also, similarly to the second embodiment, with respect to a band that exceeds the cutoff frequency, the correction control unit 109 derives a correction amount (a third blur correction amount) based solely on the result of detection of a camera shake (the output of the second filter 143) as a correction amount associated with this band in a second derivation unit 146. Then, an output unit 147 derives a final blur correction amount by adding up the correction amount associated with the band that falls below the cutoff frequency, which has been derived by the first derivation unit 145, and the third blur correction amount associated with the band that exceeds the cutoff frequency, which has been derived by the second derivation unit 146, and then outputs the final blur correction amount.

As described above, in the correction control unit 109, the filter control unit 141 causes the cutoff frequency, which is fixed irrespective of the status information in the second embodiment, to vary depending on the status information. The method of changing the cutoff frequency in the filter control unit 141 may be similar to that of the first embodiment. That is to say, for example, as described in the first embodiment, in a case where the degree of importance of a background region has been estimated based on the status information and the obtained result of estimation shows that the degree of importance is low, the filter control unit 141 increases the cutoff frequency and increases the degree of correction of a motion blur compared to a case where the obtained result of estimation shows that the degree of importance is high.

Also, the weights used in the weighted addition of the first blur correction amount and the second blur correction amount, which are used by the first derivation unit 145 in deriving a correction amount of a band that falls below the cutoff frequency, may be changed based on the status information similarly to the second embodiment, or may be constant weights irrespective of the status information. However, in a mode where the addition is performed using constant weights, it is preferable that the weight for the first blur correction amount be larger than the weight for the second blur correction amount. In a mode where the weights are changed based on the status information, in a case where the obtained result of estimation shows that the degree of importance of a background is low, the weight for camera shake correction (the gain for a camera shake) is reduced and the weight for motion blur correction is increased compared to a case where the obtained result of estimation shows that the degree of importance of the background is high, similarly to the second embodiment.

Compared to the first embodiment, the present embodiment differs also in that camera shake correction is performed with respect to the band that falls below the cutoff frequency as well. This can make blurring of a background less conspicuous than that of the first embodiment. Furthermore, in a case where the weights used in the weighted addition of the first blur correction amount and the second blur correction amount are changed in accordance with the status information, two types of parameters, namely the cutoff frequency and the weights are changed in accordance with the status information; this enables finer control than in the first and second embodiments. Moreover, for example, it is also possible to perform processing in which the filter control unit 141 and the first derivation unit 145 refer to different types of status information due to the existence of two types of parameters, such as changing of the cutoff frequency based on contrast values of a background region and changing of the weights based on the degree of reliability of main subject detection; in this way, correction control that is responsive to the characteristics of various types of blurs can be realized more easily.

Exemplary Modifications

Although the above first to third embodiments have described a mode where the present invention is applied in connection with image blur correction in which a motion blur and a camera shake are corrected at the same time, embodiments of the present invention are not limited to this. That is to say, it is sufficient that the present invention be intended to use different methods of derivation of a blur correction amount associated with a motion blur based on the status information so as to reduce the influence of deterioration of the image quality that could possibly occur in a background region due to the correction of high-frequency components of the motion blur, and the present invention is applicable also in a mode where a camera shake is not corrected at the same time.

Furthermore, a motion blur correction mode and a camera shake correction mode may be included, and a motion blur and a camera shake may be corrected respectively in the motion blur correction mode and the camera shake correction mode. In this case, in the motion blur correction mode, the influence of deterioration of the image quality that could possibly occur in a background region can be reduced by lowering the upper limit of the frequencies to be corrected on the high-frequency side compared to the camera shake correction mode.

Although the above-described first to third embodiments have presented contrast values of a background region, the depth of field at the time of image capture, the focal length at the time of image capture, the rate of occupation of a main subject region, the degree of tracking of a main subject, and the degree of reliability of main subject detection as specific examples of the status information, the status information is not limited to these.

Furthermore, while the above first to third embodiments have been described using an example in which a blur correction amount does not include high-frequency components of a motion blur, the present invention can bring about advantageous effects as long as high-frequency components are reduced.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2021-107824, filed Jun. 29, 2021, and Japanese Patent Application No. 2022-077696, filed May 10, 2022, which are hereby incorporated by reference herein in their entirety.

What is claimed is:

1. A correction control apparatus that outputs a blur correction amount associated with an image blur with respect to a group of images that have been captured, the correction control apparatus comprising at least one processor and/or circuit configured to function as following units:
a first obtainment unit configured to obtain status information indicating an image capture status of the group of images;
a second obtainment unit configured to obtain a result of detection of a motion blur with respect to the group of images;
an output unit configured to derive the blur correction amount based on the result of detection of the motion blur obtained by the second obtainment unit, and output the blur correction amount; and
a control unit configured to control a method of derivation of the blur correction amount by the output unit,
wherein
the output unit includes a first filter unit that extracts components of a first frequency band from the result of detection of the motion blur, and derives the blur correction amount based on the components of the first frequency band associated with the motion blur extracted by the first filter unit, and
the control unit causes the first frequency band extracted by the first filter unit to vary in accordance with the status information obtained by the first obtainment unit.

2. The correction control apparatus according to claim 1, wherein
the first filter unit is a low-pass filter configured to be capable of causing a blocked high-frequency band to vary.

3. The correction control apparatus according to claim 1, wherein
the at least one processor and/or circuit further functions as a third obtainment unit configured to obtain a result of detection of a camera shake that has occurred at the time of image capture of the group of images,
the output unit further includes a second filter unit configured to extract components of a second frequency band from the result of detection of the camera shake obtained by the third obtainment unit,
the control unit causes the second frequency band extracted by the second filter unit to vary in accordance with the status information,
the second frequency band includes at least a frequency band different from the first frequency band, and
the output unit derives the blur correction amount based on the components of the first frequency band associated with the motion blur, and on the components of the second frequency band associated with the camera shake extracted by the second filter unit.

4. The correction control apparatus according to claim 3, wherein
the second filter unit is a high-pass filter configured to be capable of causing a blocked low-frequency band to vary.

5. The correction control apparatus according to claim 1, wherein
the control unit includes an estimation unit that estimates a degree of importance of a background region in the group of images based on the status information, and
in a case where the degree of importance of the background region in the group of images falls below a predetermined threshold, the control unit changes the first frequency band to be extracted by the first filter unit so that a band of higher frequencies is included therein.

6. The correction control apparatus according to claim 1, wherein
the control unit includes an estimation unit that estimates a degree of importance of a background region in the group of images based on the status information, and
the control unit changes the first frequency band to be extracted by the first filter unit so that a band of higher frequencies is included therein in a first case than in a second case, the first case involving a low degree of importance of the background region in the group of images, the second case involving a higher degree of importance of the background region than in the first case.

7. The correction control apparatus according to claim 1, wherein
the control unit causes a degree of contribution of the components of the first frequency band associated with the motion blur in derivation of the blur correction amount to vary in accordance with the status information.

8. The correction control apparatus according to claim 7, wherein
the at least one processor and/or circuit further functions as a third obtainment unit configured to obtain a result of detection of a camera shake that has occurred at the time of image capture of the group of images,
the output unit further includes a third filter unit configured to extract components of the first frequency band from the result of detection of the camera shake obtained by the third obtainment unit,
the output unit derives the blur correction amount by combining a first blur correction amount and a second blur correction amount, the first blur correction amount being based on the components of the first frequency band associated with the motion blur, the second blur correction amount being based on the components of the first frequency band associated with the camera shake extracted by the third filter unit, and the control unit causes a method of combining the first blur correction amount and the second blur correction amount to vary in accordance with the status information.

9. The correction control apparatus according to claim 8, wherein the output unit further includes a second filter unit configured to extract components of a second frequency band from the result of detection of the camera shake obtained by the third obtainment unit, the second frequency band is a frequency band different from the first frequency band, and the output unit derives the blur correction amount by further combining a third blur correction amount based on the components of the second frequency band associated with the camera shake extracted by the second filter unit.

10. The correction control apparatus according to claim 9, wherein the first filter unit and the third filter unit are low-pass filters that block a predetermined high-frequency band, and the second filter unit is a high-pass filter that blocks a predetermined low-frequency band.

11. The correction control apparatus according to claim 1, wherein the status information includes at least one of information related to a main subject whose blurring is detected by the second obtainment unit, information related to a background, and information indicating image capture settings at the time of image capture.

12. The correction control apparatus according to claim 11, wherein the status information includes at least one of information indicating contrast values of a background region, information indicating sharpness of the background region, information indicating a depth of field at the time of image capture, information indicating a focal length at the time of image capture, information indicating a rate of occupancy of a main subject region in the group of images, information indicating a degree of tracking of a main subject at the time of image capture, and information indicating a degree of reliability of main subject detection.

13. The correction control apparatus according to claim 5, wherein the estimation unit obtains information indicating contrast values of the background region as the status information, and estimates that the degree of importance of the background region is lower when the contrast values of the background region are low than when the contrast values are high.

14. The correction control apparatus according to claim 5, wherein the estimation unit obtains information indicating a depth of field at the time of image capture as the status information, and estimates that the degree of importance of the background region is lower when the depth of field at the time of image capture is small than when the depth of field is large.

15. The correction control apparatus according to claim 5, wherein the estimation unit obtains information indicating a focal length at the time of image capture as the status information, and estimates that the degree of importance of the background region is lower when the focal length at the time of image capture is long than when the focal length is short.

16. The correction control apparatus according to claim 5, wherein the estimation unit obtains information indicating a rate of occupancy of a main subject region in the group of images as the status information, and estimates that the degree of importance of the background region is lower when the rate of occupancy of the main subject region in the group of images is high than when the rate of occupancy is low.

17. The correction control apparatus according to claim 5, wherein the estimation unit obtains information indicating a degree of tracking of a main subject in the group of images as the status information, and estimates that the degree of importance of the background region is lower when the degree of tracking of the main subject at the time of image capture is high than when the degree of tracking is low.

18. The correction control apparatus according to claim 5, wherein the estimation unit obtains information indicating a degree of reliability of main subject detection as the status information, and estimates that the degree of importance of the background region is lower when the degree of reliability of main subject detection is high than when the degree of reliability of the main subject detection is low.

19. An image capturing apparatus, comprising:
an image capturing unit;
a detection unit configured to detect an image blur;
the correction control apparatus according to claim 1; and
a correction unit configured to perform image blur correction based on the blur correction amount output from the correction control apparatus.

20. A control method for a correction control apparatus that outputs a blur correction amount associated with an image blur with respect to a group of images that have been captured, the control method comprising:
obtaining status information indicating an image capture status of the group of images;
obtaining a result of detection of a motion blur with respect to the group of images;
extracting components of a first frequency band from the result of detection of the motion blur;
deriving the blur correction amount based on the extracted components of the first frequency band associated with the motion blur, and outputting the blur correction amount; and
controlling a method of derivation of the blur correction amount in the outputting,
wherein
in the controlling, the method of derivation is controlled so that the first frequency band extracted from the result of detection of the motion blur varies in accordance with the obtained status information.

21. A computer-readable recording medium including a program recorded therein, the program being intended to cause a computer to function as each unit of the correction control apparatus according to claim 1.

* * * * *